United States Patent Office 3,166,518
Patented Jan. 19, 1965

3,166,518
ELECTRICALLY CONDUCTIVE CONCRETE
Earl H. Barnard, Houston, Tex., assignor to Schlumberger Well Surveying Corporation, Houston, Tex., a corporation of Texas
No Drawing. Filed Dec. 29, 1960, Ser. No. 79,153
3 Claims. (Cl. 252—503)

The present invention relates to electrically conductive cement and concrete.

The use of high strength concrete having good electrical conductivity is necessary in various construction applications, such as industrial buildings, enclosures for explosive materials or vapors, foundations for electrical equipment, underground installation in mines and oil wells, as well as others to provide a functional electrical conductor for electrical grounding or other purposes.

It has now been found that cement having the property of relatively constant electrical resistivity over an indefinite period of time may be prepared from a binder material such as Portland cement, in which electrically conductive materials such as iron filings and carbon black are incorporated. If additional strength is required, electrically conductive aggregate may be included. Where a higher resistivity is permissable, non-conductive aggregate may be used.

The quantity of cement varies from about 50% to about 75% by weight of the total composition. Below the former figure, the cured strength of the resultant product is very low; the latter figure is the maximum if reasonably low resistivity is to be realized. The density of the cement may be varied by adjusting the proportions of the aggregate incorporated therein. Any suitable aggregate may be used such as the light weight, organic material marketed as "Strata-Crete No. 6." Usually, no more than 40% aggregate is included.

The iron filings, when oxidized, impart frequency stability to the product, i.e., they insure substantially constant electrical resistivity over a wide range of frequencies (5–20,000 cycles per second). It is important that the iron filings be oxidized, although sufficient oxidation may occur after incorporation into the concrete. Preferably, the oxidation should take place on all surfaces of the particles. The iron filings are preferably added in an amount from about 5% to about 30% by weight, and the commercially available product known as "Belmont's No. 50 grade" is entirely satisfactory for the purpose. These are plate-like particles having tarnished surfaces. Other iron particles may be used, of course, provided they are of the proper size and shape to be easily mixed and to remain in dispersion.

The amount of carbon black used in the composition determines its electrical conductivity. With about 10% by weight of carbon black, an electrical resistivity of less than one ohm-meter, can be achieved. If too much carbon black is used, however, the cement will not set up and, on the other hand, if too little is used, the conductivity will be very low. Generally, it is preferred to use from about 1% to about 3% by weight of carbon black. This may be acetylene black or any other suitable carbon black such as the product known as "Vulcan XC–72," which is made by Godfrey L. Cabot Co.

The following are nonlimiting examples of neat cement compositions embodying the present invention, all of which have suitable physical properties and different values of electrical resistivity; in each case sufficient water is added to the ingredients to form a workable paste:

EXAMPLE 1

| Ingredients: | Parts by weight |
|---|---|
| Portland cement | 94 |
| Strata-crete No. 6 | 43 |
| Iron filings | 33 |
| Acetylene black | 5 |

Samples of the above-described matrix or "neat cement" showed a volume resistivity of 2 ohm-meters or less. When mixed with conventional aggregate in a 1 to 1 volume ratio, the resulting concrete showed a volume resistivity of 7 ohm-meters.

EXAMPLE 2

| Ingredients | Parts by Weight | Volume Resistivity, Ohm-meters |
|---|---|---|
| Portland cement | 54.5 | |
| Strata-crete No. 6 | 12.55 | 5.8 |
| Iron Filings | 29.1 | |
| Acetylene Black | 1.96 | |

EXAMPLE 3

| | | |
|---|---|---|
| Portland Cement | 61.6 | |
| Strata-crete No. 6 | 14.2 | 5.02 |
| Iron Filings | 21.95 | |
| Acetylene Black | 2.19 | |

EXAMPLE 4

| | | |
|---|---|---|
| Portland Cement | 53.7 | |
| Strata-crete No. 6 | 24.5 | 3.23 |
| Iron Filings | 19.0 | |
| Acetylene Black | 2.85 | |

EXAMPLE 5

| | | |
|---|---|---|
| Portland Cement | 62.5 | |
| Strata-crete No. 6 | 14.2 | 2.98 |
| Iron Filings | 22.0 | |
| Vulcan XC-72 | 1.6 | |

EXAMPLE 6

| | | |
|---|---|---|
| Portland Cement | 70.5 | |
| Strata-crete No. 6 | 17.0 | |
| Iron Filings | 6.5 | 2.3 |
| Vulcan XC-72 | 2.0 | |
| Bentonite | 4.0 | |

EXAMPLE 7

| | | |
|---|---|---|
| Portland Cement | 61.5 | |
| Strata-crete No. 6 | 14.0 | 2.18 |
| Iron Filings | 21.3 | |
| Vulcan XC-72 | 3.2 | |

For many applications, a conductive matrix of the type described above alone will provide the required physical and electrical properties. If higher strength is required, additional aggregate may be included in the matrix. Where high values of electrical resistivity are desired, ordinary aggregate materials may be used in the customary manner, as in the following illustrative examples:

EXAMPLE 8

| Ingredients | Percent by Weight | Percent by Volume | Volume Resistivity, Ohm-meters |
|---|---|---|---|
| Portland Cement | 64.5 | 33⅓ [1] | 8.8 |
| Stratacrete No. 6 | 14.9 | | |
| Iron Filings | 17.2 | | |
| Acetylene Black | 3.4 | | |

EXAMPLE 9

| Ingredients | Percent by Weight | Percent by Volume | Volume Resistivity, Ohm-meters |
|---|---|---|---|
| Portland Cement | 53.5 | 50.0 [2] | 7.2 |
| Stratacrete No. 6 | 24.6 | | |
| Iron Filings | 19.0 | | |
| Acetylene Black | 2.9 | | |

EXAMPLE 10

| Ingredients | Percent by Weight | Percent by Volume | Volume Resistivity, Ohm-meters |
|---|---|---|---|
| Portland Cement | 61.7 | 33⅓ [3] | 5.02 |
| Stratacrete No. 6 | 14.3 | | |
| Iron Filings | 21.8 | | |
| Acetylene Black | 2.2 | | |

[1] 66⅔ gravel.
[2] +50.0 gravel.
[3] +66⅔ gravel.

Where high physical strength is required with high electrical conductivity, the surfaces of the aggregate should preferably be coated to reduce the effective electrical cross-section of the material. This may be done by encapsulating the aggregate in a composition comprising electrically conductive materials in a binder. The latter may be any film forming material, but a material such as epoxy resin is particularly useful by reason of its strength, inertness and compatibility with cement. Suitable coating compositions may comprise the following ingredients in the amounts indicated.

Ingredients:                                    Parts by weight
    Epon 815 _____ 100
    Acetylene black _____ 20
    Xylene _____ 25
    Iron filings No. 50 grade _____ 135
    Triethylene tetramine _____ 10

Epon Resin 815 is a light colored, low viscosity, epichlorohydrin/bisphenol A-type epoxy resin containing a reactive diluent, produced by Shell Chemical Company. It has an average molecular weight (approximate) of 330 and an epoxide equivalent of 175–195. The xylene serves as a solvent used for lowering its viscosity; other solvents may, of course, be used. The triethylene tetramine is the curing agent for the epoxy resin. Any suitable epoxy curing agents may, however, be substituted. The acetylene black and iron filings serve the same functions as in the conductive cement compositions described above, and their proportions may be varied in the same way, depending upon the particular characteristics desired.

The following is an example of concrete mixed with the above-described conductive matrix and encapsulated aggregate:

EXAMPLE 11

| Ingredients | Percent by Weight | Percent by Volume | Volume Resistivity, Ohm-meters |
|---|---|---|---|
| Portland Cement | 71.0 | 50.0 [1] | 2.85 |
| Iron Filings | 25.2 | | |
| Acetylene Black | 3.8 | | |

[1] +50.0 special coated gravel.

It is to be understood that the present invention is not limited to electrically conductive concrete which contains cement. For example, resins, plastics, ceramics and other film forming materials which may be cast or molded may be substituted for the Portland cement, and equally good results obtained. One example of a composition embodying a plastic binder is the above-mentioned formulation for encapsulating the aggregate.

One possible use for conductive concrete, made according to the invention, is as a conductive lining for a well drilled into the earth. For example, in completing a well, a liner of aluminium may be inserted and conductive cement according to the invention may be pumped into the space between the liner and the well wall. When the cement has hardened, the liner can be removed leaving the cemented hole for test use. This technique may be used in field reservoir studies where the depletion of the reservoir may be studied by making periodic electrical logs in a well after lining with conductive cement in the manner just described.

Where low sensitivity to frequency change is not important, as where electrical conductivity to direct current only is required, the iron filings are not so important and may be omitted.

As many and varied modifications of the subject matter of this invention will become apparent to those skilled in the art from the detailed description given herein, it should be understood that this invention is to be limited only in accordance with the appended claims.

I claim:
1. An electrically conductive composition consisting essentially of, by weight, from about 50 to about 75% Portland cement, from about 0 to about 40% aggregate, from about 5 to about 30% iron filings, and from about 1 to about 3% carbon black.

2. An electrically conductive composition consisting essentially of by volume, from about 33⅓% to about 50% cement mixture and from about 50% to about 66⅔% aggregate, the cement mixture consisting essentially of, by weight, from about 1% to about 3% carbon black, from about 50% to about 75% Portland cement, and from about 5% to about 30% iron filings, and the surfaces of said aggregate being covered with a coating consisting essentially of carbon black and iron filings incorporated in an epoxy resin binder.

3. The electrically conductive composition as defined in claim 2, wherein the coating consists essentially of by weight about 100 parts epoxy resin binder, about 20 parts carbon black and about 135 parts iron filings.

References Cited in the file of this patent

UNITED STATES PATENTS

| | | |
|---|---|---|
| 1,113,555 | Haldeman | Oct. 13, 1914 |
| 1,582,141 | Nowotny | Apr. 27, 1926 |
| 1,735,793 | Reed | Nov. 12, 1929 |
| 1,818,184 | Work et al. | Aug. 11, 1931 |
| 2,108,276 | Wadsworth | Feb. 15, 1938 |
| 2,186,792 | Wilsnack | Jan. 9, 1940 |
| 2,726,339 | Borst | Dec. 6, 1955 |
| 2,744,845 | Rudoff | May 8, 1956 |
| 2,761,849 | Coler | Sept. 4, 1956 |
| 2,795,680 | Peck | June 11, 1957 |
| 2,857,338 | Rolfs et al. | Oct. 21, 1958 |